United States Patent
Lagoutte et al.

[11] Patent Number: 5,819,905
[45] Date of Patent: Oct. 13, 1998

[54] DEVICE AND METHOD FOR MOVING OBJECTS ALONG A CIRCUIT

[75] Inventors: Alain Lagoutte, Buxy; Noël Talpin, Le Creusot; Pierre Junalik, F—Montceau-Les-Mines, all of France

[73] Assignee: Mag-Plastic S.A., Plan-Les-Ouates, Switzerland

[21] Appl. No.: 721,092

[22] Filed: Sep. 27, 1996

[30] Foreign Application Priority Data

Sep. 29, 1995 [FR] France .................................. 95 11747

[51] Int. Cl.[6] .................................................. B65G 37/00
[52] U.S. Cl. .................................. 198/465.1; 198/468.9
[58] Field of Search ............................. 198/465.1, 465.2, 198/465.3, 803.4, 468.01, 468.9, 468.1

[56] References Cited

U.S. PATENT DOCUMENTS

| 4,694,951 | 9/1987 | Gibbemeyer . | |
|---|---|---|---|
| 5,213,195 | 5/1993 | Sticht | 198/465.1 X |
| 5,735,384 | 4/1998 | Lingo et al. | 198/465.1 |

FOREIGN PATENT DOCUMENTS

| B-299067 | 4/1972 | Australia . |
|---|---|---|
| A-2697235 | 4/1994 | France . |
| C-468971 | 11/1928 | Germany . |

*Primary Examiner*—James R. Bidwell
*Attorney, Agent, or Firm*—Davis and Bujold

[57] ABSTRACT

The actuating device comprises an actuator arm (11) pivoting about a rotating axle (12) and driving two devices (15, 16) for displacing pallets. These devices also pivot and are laterally displaced along the axles (24, 25) integral with the arm (11) and are located at different distances from the rotating axle (12). The first displacement device (15) consists of a comb (26) with regularly spaced lateral notches. The second displacement device (16) consists of a comb (30) with one lateral notch at each extremity. When the actuator arm is retracted, the notches in the combs (26, 30) grasp a pallet. When the arm advances, the distances by which the pallets maintained in each of the displacement devices (15) are displaced are different. The pallets are separated from one another when a pallet maintained by the first device (15) is downstream from a pallet maintained by the second device (16), and they are moved together when this position is reversed.

15 Claims, 6 Drawing Sheets

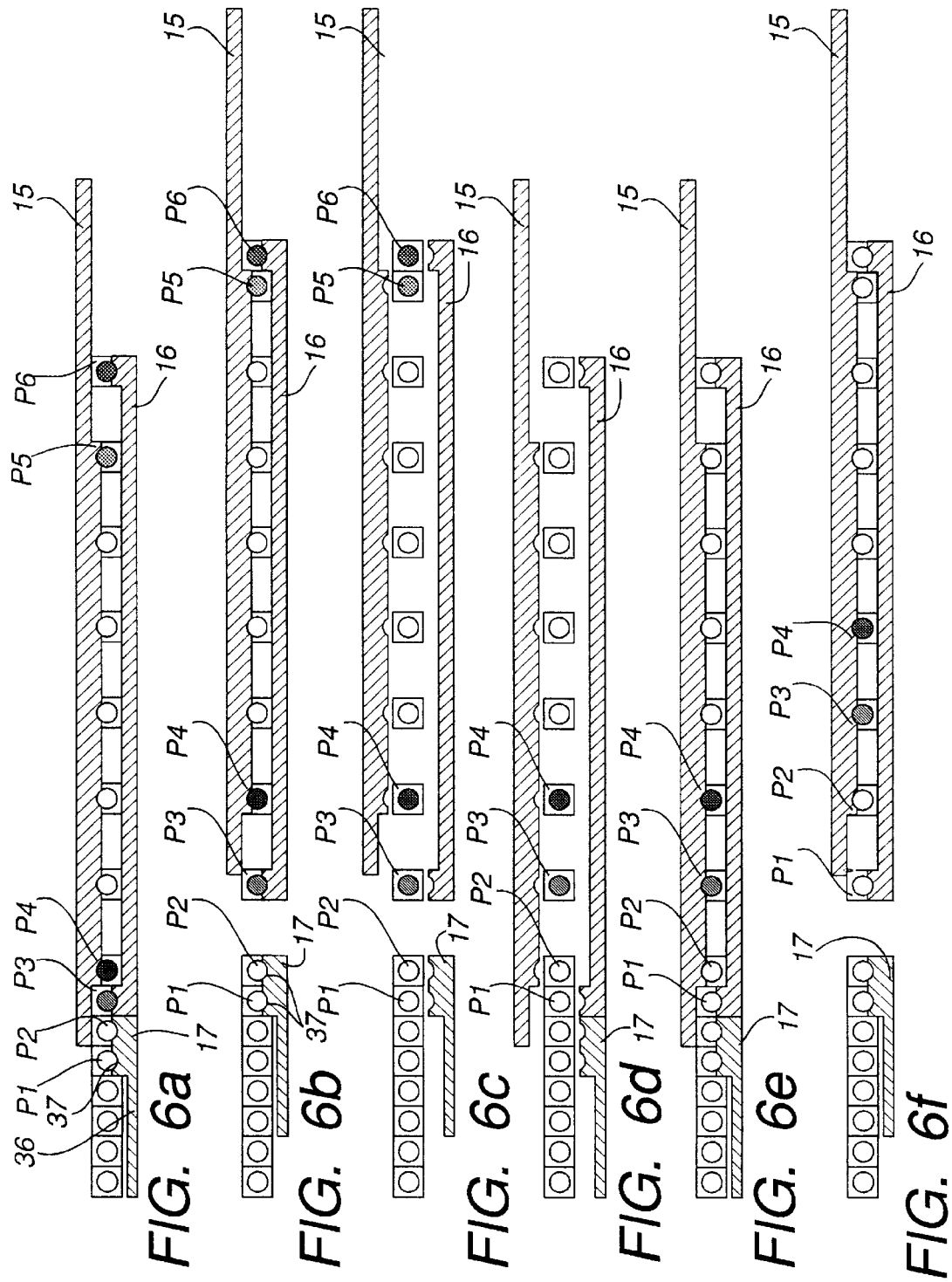

DEVICE AND METHOD FOR MOVING OBJECTS ALONG A CIRCUIT

The present invention concerns a device and a method for moving objects along a circuit consisting of at least one rail, said objects being placed on pallets sliding on the rail; on at least one portion of the circuit, the pallets are separated by a first distance and on at least one other portion of the circuit, the pallets are separated by a second distance.

In a large number of industrial manufacturing machines, products must be moved along a closed circuit to pass through various workstations. A different type of operation is performed at each station. When the products consist of discrete elements, for example, products transported on pallets, it is often necessary to modify the spacing between two consecutive elements to adapt to a particular workstation.

Devices for modifying the spacing usually consist of a large number of actuators synchronized by a complex and costly control mechanism. Other devices use rectangular pallets that are adjacent at their long side on one portion of the circuit and on their short side on another portion of the circuit. This is not a workable solution, and furthermore, it imposes unacceptable limitations on the design of the machine.

The present invention remedies these disadvantages by providing a simple, economical device for moving pallets which hold products along the circuit of a production machine by altering the spacing between pallets according to production requirements.

This is achieved by a device such as that described in the preamble, characterized in that it comprises an actuator arm pivoting on a rotating axle, said actuator arm being connected to at least a first and a second pallet displacement device, said displacement devices moving the pallets along the rail and separating them by a first distance on the first portion of the circuit and by a second distance on the second portion of the circuit, and said displacement devices being connected to said actuator arm at different distances from its axis of rotation.

According to a preferred embodiment, the device comprises a means for displacing the actuator arm, placing the arm in a position known as the retracted position, in which the portion of the arm connected to the displacement devices is located near the first portion of the circuit, and in a second position called the advanced position, in which that portion of the arm is located near the second portion of the circuit.

Each displacement device advantageously comprises a comb with at least one notch which moves a pallet.

According to a preferred embodiment, the comb on the first displacement device has several regularly spaced notches, and the separation between pallets maintained by these notches corresponds to the second distance.

The comb of said second displacement device preferably comprises a first notch designed so that when the actuator arm is retracted, the pallets held in the first notch of each displacement device are separated by said first distance, with the pallet held in the first displacement device being downstream from the pallet maintained by said second displacement device; the second displacement device comprises a second notch designed so that when the actuator arm is advanced, the pallet maintained in said second notch and the pallet maintained in the last notch of the said first displacement device are separated by a first distance, while the pallet maintained in the first displacement device is upstream from the pallet held by said second displacement means.

According to a specific embodiment of the present invention, the displacement devices are designed to separate said pallets by said first distance on a third portion of the circuit situated downstream from said second portion of the circuit.

The device according to the present invention advantageously comprises a maintenance device formed of at least one comb with at least one notch, said device being designed to maintain at least one pallet in such a position that it is separated by said first distance from the first pallet maintained by one of the displacement devices when the actuator arm is retracted.

According to a preferred embodiment, the device comprises a means for laterally displacing the combs in relation to the rail of the circuit.

Said lateral displacement device preferably comprises a guide rail with an interior sliding support allowing the combs to be displaced perpendicularly to the rail.

According to an advantageous embodiment, the displacement devices and the maintenance device are connected to said actuator arm with bearings for lateral displacement of said devices in relation to the actuator arm.

The goal of the present invention is also achieved by the method described in the preamble, characterized in that at least one pallet is displaced for a predetermined distance by at least one displacement device, and at least one other pallet is displaced for a second predetermined distance, smaller than the first predetermined distance, using a second displacement device; before displacement, the pallets are separated by said first distance and after displacement, by said second distance, and the two displacement devices are actuated by a single actuator arm, which can be placed in what is known as the retracted position, in which the portion of the arm connected to the displacement devices is located near the first portion of the circuit, and into a second position known as the advanced position, in which said portion of the arm is located near the second portion of the circuit.

According to a preferred embodiment, the first displacement device moves a series of pallets, with the pallets in this series being separated by said second distance.

Advantageously, said second displacement device displaces a pallet located upstream from said series of pallets, which is separated from the first pallet in this series by said first distance, when the actuator arm is retracted, and another pallet located downstream from said series of pallets, which is separated by said second distance from the last pallet in said series of pallets, when the actuator arm is retracted.

According to an advantageous embodiment, the pallet displacement devices are disengaged when the actuator arm is advanced, the displacement devices are retracted by placing the arm in the retracted position, and the displacement devices are engaged around the pallets when the actuator arm has attained the retracted position.

According to a preferred embodiment, a maintenance device maintains at least one pallet in such a position that it is separated by said first distance from the first pallet maintained by said displacement devices when the actuator arm is retracted.

The present invention and its advantages will be more readily understood with reference to the description of one embodiment and to the attached drawings, wherein:

FIGS. 6a through 6f are schematic representations of the different stages of pallet displacement along the production circuit of the machine.

Figure 1:
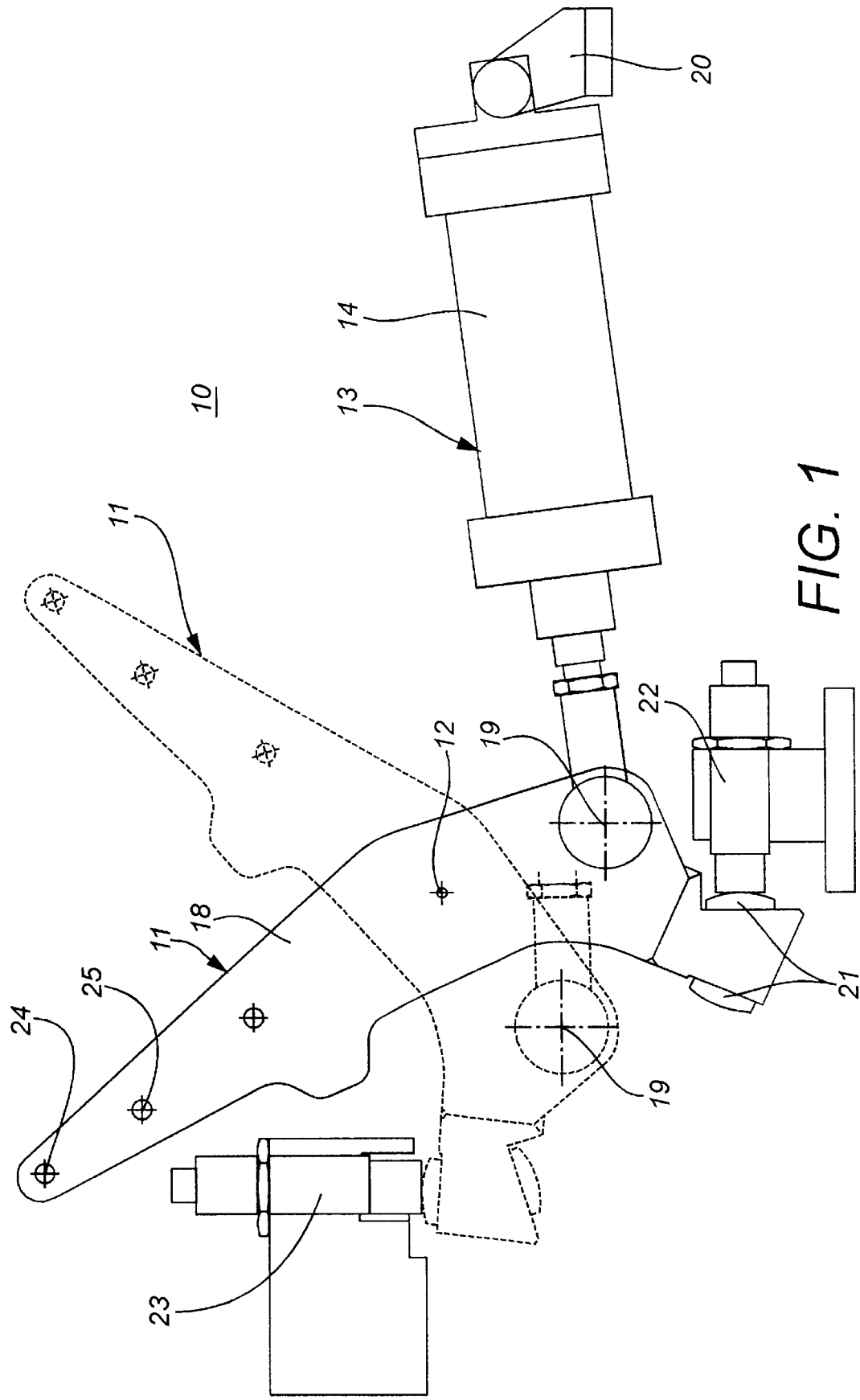
FIG. 1 is a schematic view showing the actuator arm of the device according to the present invention, in two different positions.

The present invention will be described with reference to one concrete embodiment wherein the actuator device 10 is attached to the frame of a thermoplastic bottle manufacturing machine. This machine comprises a rail forming a circuit, along which pallets P slide and transport preforms for manufacturing bottles. On the first portion of the circuit, the pallets are juxtaposed and they advance along the rail. On the second portion of the circuit, they are separated from each other for the introduction of preforms two by two into the molds, where the bottles are blow-molded. The spacing between pallets must correspond to the spacing between the mold impressions. Next, the bottles are taken from the mold, and then they are removed from the pallets. Thereafter, the pallets are placed tightly together in order to occupy as little space as possible as they return to the beginning of the production line.

With reference to the drawings, actuator device 10 according to the present invention consists of an actuator arm 11 pivoting around a rotating axle 12 and driven by actuator means 13. The actuator means may consist, for example, of an actuator cylinder 14, or a motor. Actuator arm 11 is connected to two devices 15, 16 for displacing the pallets and a pallet maintenance device 17.

Figure 2:
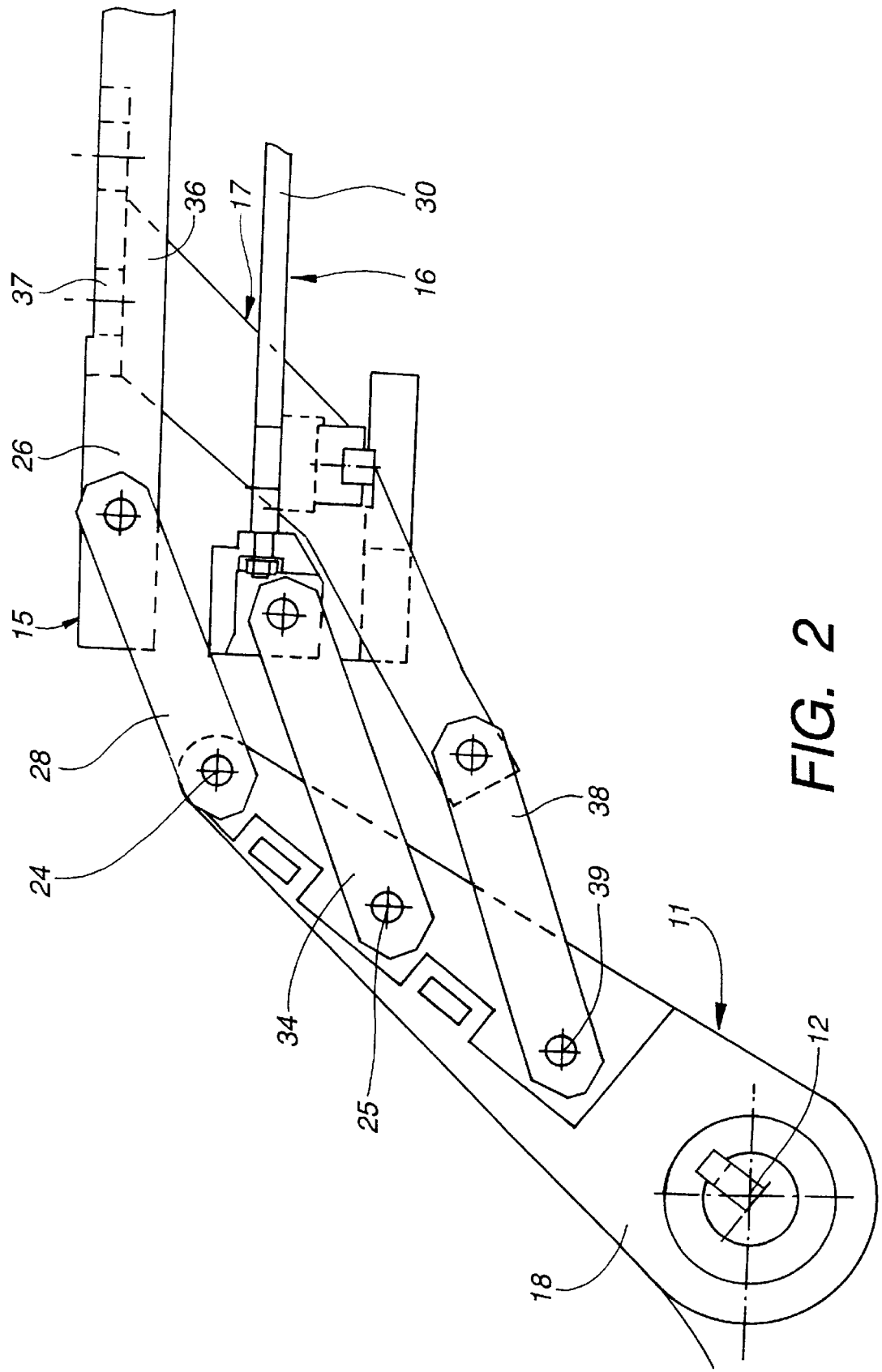
FIG. 2 is a view of the various elements driven by the actuator arm of FIG. 1.
Figure 3:
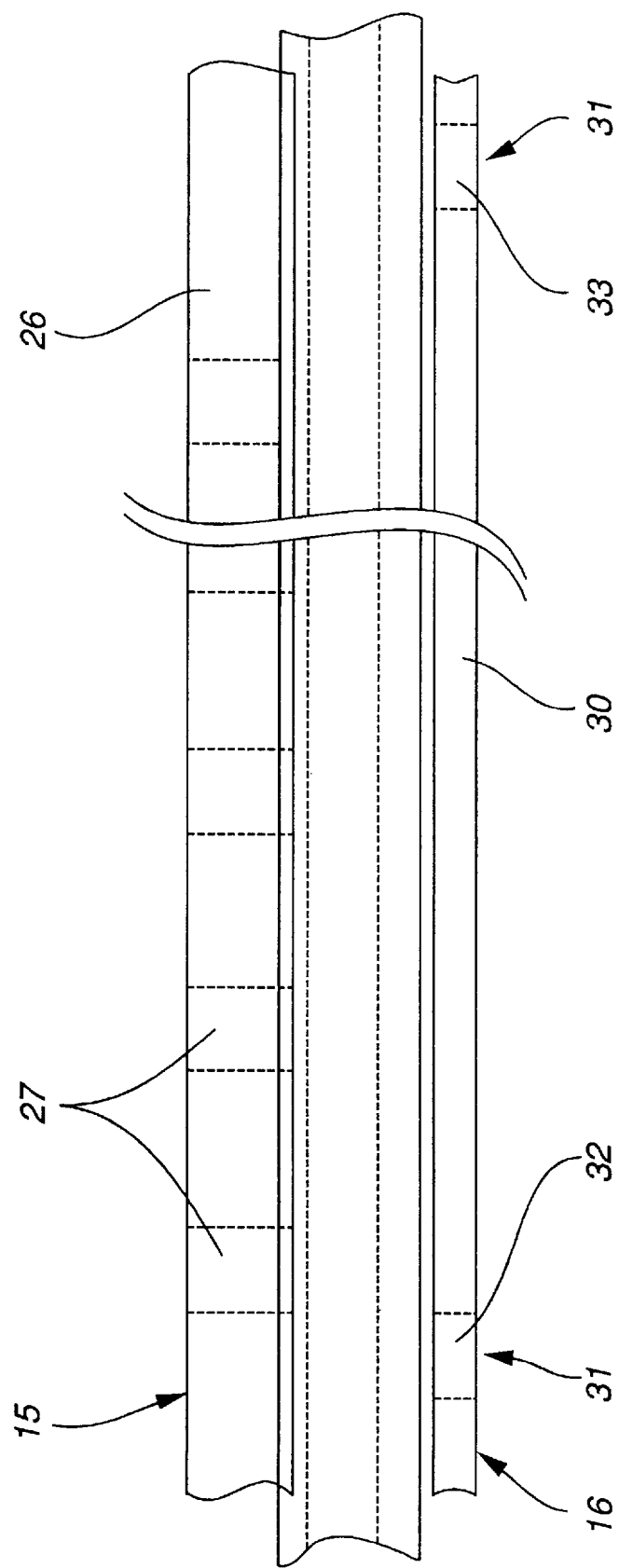
FIG. 3 is a view of the combs connected to the elements of FIG. 2.
Figure 4:
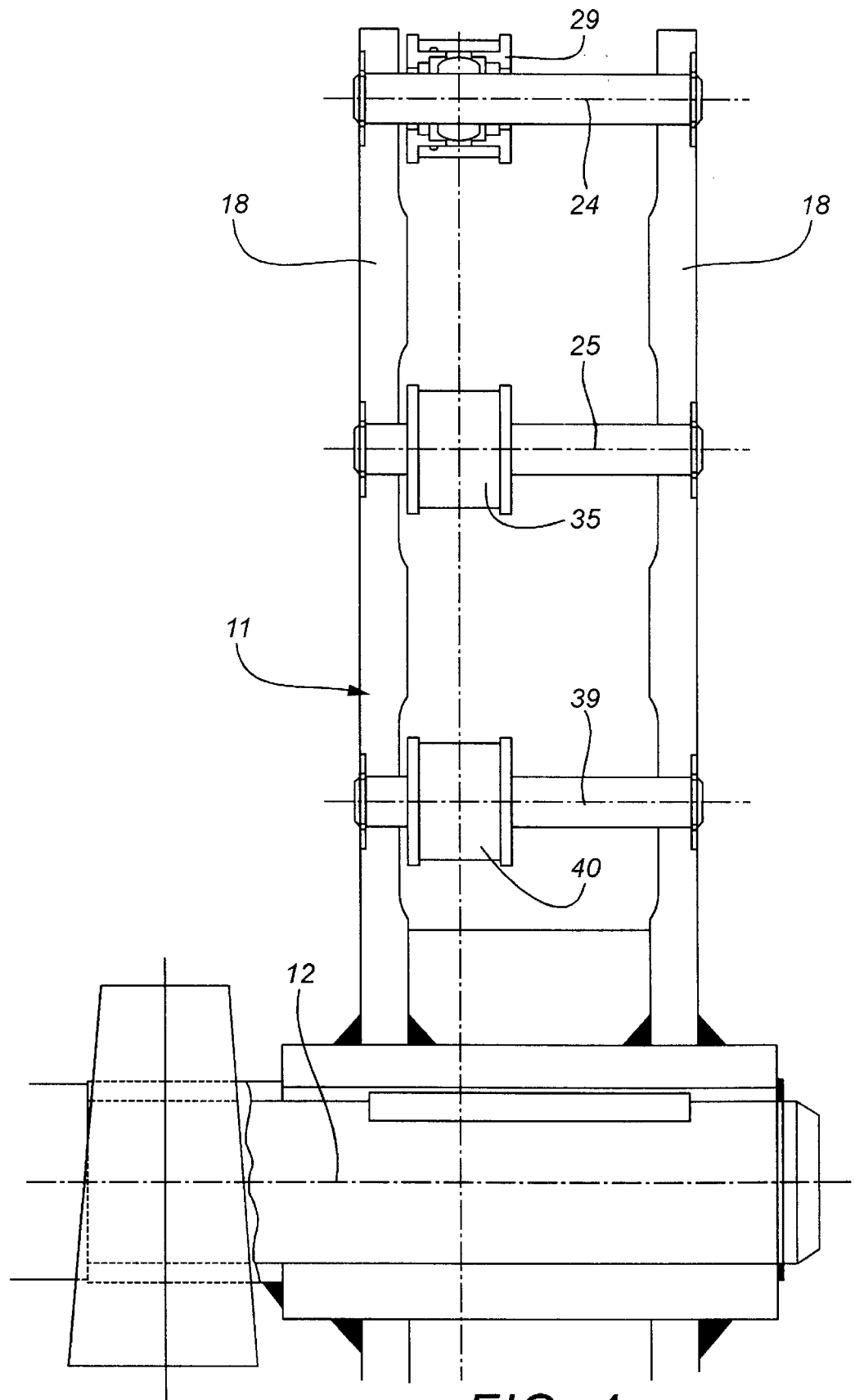
FIG. 4 is a rear view of the arm of FIG. 2.
Figure 5:
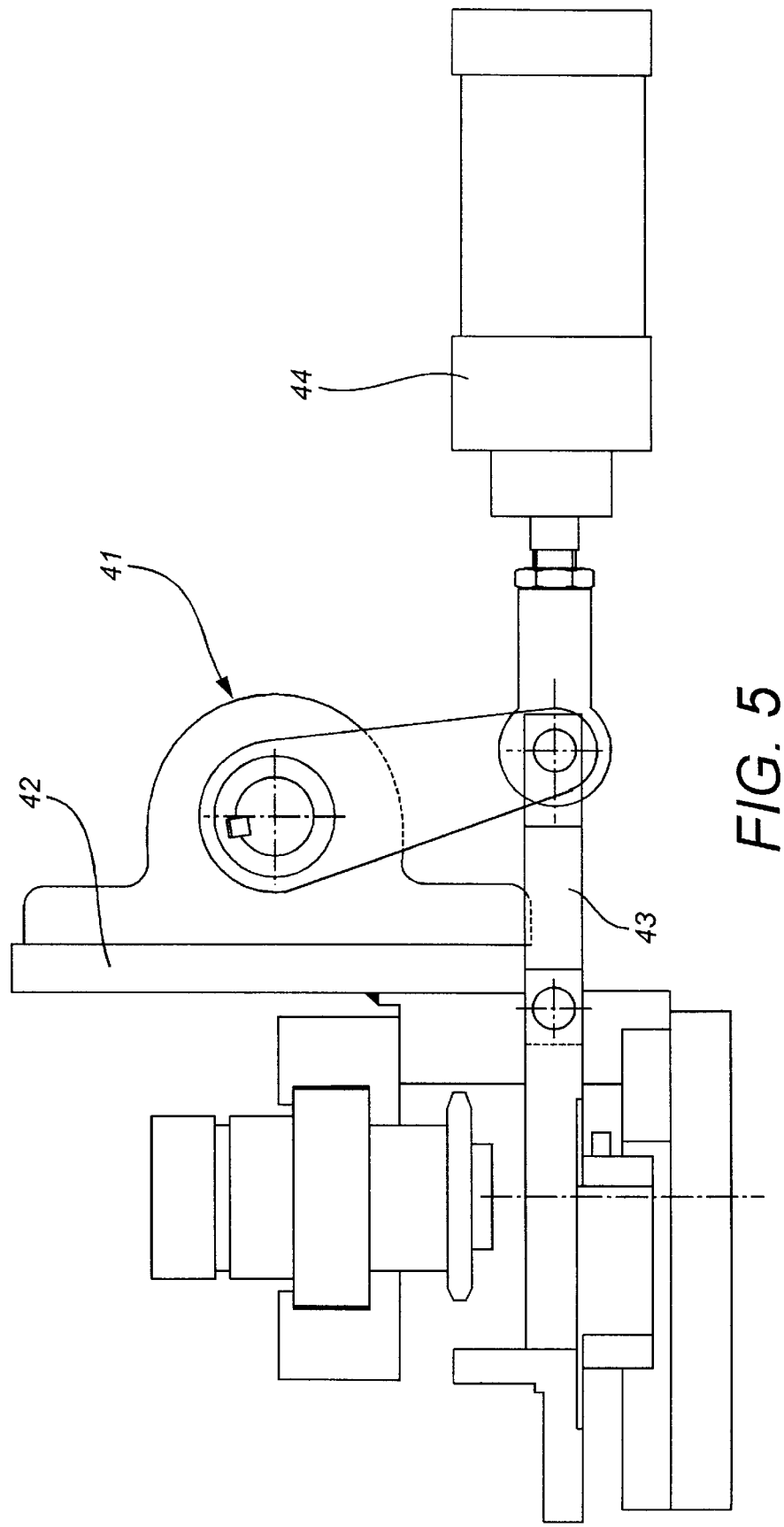
FIG. 5 shows the means for laterally displacing the rods of FIG. 3.

Actuator arm 11 is specifically shown in FIGS. 1, 2 and 4 and consists of two parallel flasks 18 interconnected by rotating axle 12 of the arm. The rotating axle is integral with the machine frame. Arm 11 is connected to cylinder 14 by means of cylinder axle 19 pivotably connected to one end of said cylinder. The other end of the cylinder is pivotably connected to a support 20 integral with the machine frame. The actuator arm also comprises two stops 21 defining its course between two extreme positions, said stops contacting two blocks 22, 23 integral with said frame. The actuator arm is connected to each displacement device 15, 16 by an axle 24, 25 integral with the flasks. These axles are located at different distances from rotating axle 12 of the actuator arm.

The first displacement device 15 consists of a comb 26 with lateral notches 27. The shape of the notches is adapted to the dimension and shape of the pallets so the pallets can be placed between the notches and moved along as the comb is displaced. The distance between the axes of notches 27 corresponds to the distance between the axes of the pallets when they are on the second portion of the circuit, that is, when they are separated from each other by said second distance. Comb 26 slides parallel to the machine rail. The comb is connected to axle 24 of actuator arm 11 by an arm 28 connected to one extremity of the comb so it can pivot and also connected so it can pivot and be laterally displaced along axle 24 of the actuator arm. Bearing 29 allows this lateral displacement.

Similarly, second displacement device 16 is also composed of a comb 30 having lateral notches 31. The comb has a first notch 32 which is as wide as one pallet and situated in such a way that when actuator arm 11 is retracted, as shown by the solid line in FIG. 1, two pallets respectively placed in the first notch of the two combs of the displacement devices are juxtaposed, with the pallet maintained by the first comb 26 being placed downstream from the pallet maintained by the second comb 30. This second comb further comprises a second notch 33 situated in such a way that, when actuator arm 11 is placed in the advanced position as shown by the dashed lines in FIG. 1, two pallets respectively placed in the last notch of the two combs of displacement devices 15 and 16 are juxtaposed, with the pallet maintained by first comb 26 being placed upstream from the pallet maintained by second comb 30. The second comb is also connected to axle 25 of the actuator arm by means of an arm 34 pivotably attached to one extremity of comb 30, and also attached so that it can both pivot and be laterally displaced on axle 25 of the actuator arm. Bearing 35 allows this lateral displacement.

Maintenance device 17 consists of a comb 36 comprising two adjacent notches 37 designed so that one pallet can be held in each notch, with the pallets thus being juxtaposed. When actuator arm 11 is in the retracted position shown by solid line in FIG. 1, comb 36 maintains two pallets in place, these two pallets being juxtaposed with the pallets maintained by the first notch in combs 26 and 30, upstream from these pallets. Comb 36 also slides along the rail and is attached to actuator arm 11 by an arm 38 which pivots around the end of the comb and also pivots and slides on one axle 39 of the actuator arm. Arm 38 also comprises a bearing 40. The essential function of the maintenance device is to ensure correct positioning of the pallets which will be held in the displacement devices. If a machine is vibrating forcefully, the pallets can be dislodged and cause the device to malfunction.

In the embodiment shown, the pallets form a generally square area as they slide along the rail, an upper cylindrical area above the square area, and a lower cylindrical area beneath the square area. Notches 27 of displacement device 15 contact the upper cylindrical area of the pallet, while the notches of combs 30 and 36 contact the lower cylindrical area of these pallets.

Actuator device 10 according to the present invention further comprises means 41 for laterally displacing the combs. These displacement devices allow the notches of different combs to engage pallets in order to hold them in place and move them, and then they disengage. These displacement devices consist essentially of a support 42 within which the three combs 26, 30 and 36 slide longitudinally; a guide rail 43 within which the support slides laterally; and a cylinder 44 which displaces support 42 so that it alternately advances toward and retreats from the machine.

The use of the actuator device to displace pallets in accordance with the invention is explained below with reference to FIGS. 6a through 6f, which show the combs and the pallets viewed from above. In these drawings, the pallets are shown with a square support having one cylindrical area. To clarify the drawing, displacement device 15 is shown above the pallets and displacement device 16 and maintenance device 17, below the pallets. In practice, it is generally simpler to arrange the three combs on the same side of the rail. In these drawings, the six pallets are referenced as P1 through P6 to distinguish them from the other pallets and follow their displacement more easily.

First, actuator cylinder 14 is in the starting position and the highest part of actuator arm 11 is in the retracted position. Displacement devices 15 and 16 and maintenance device 17 are arranged so that one pallet is engaged in each of the notches on these devices. The position described above is shown in FIG. 6a. In this position, pallets P1, P2, P3 and P4 are juxtaposed, corresponding to the first spacing. Pallets P5 and P6 are separated by a distance that corresponds to the second spacing. Said second spacing may correspond to the spacing between two impressions on the mold used for blow-molding bottles.

Cylinder 14 is then actuated to pivot actuator arm 11 and move displacement devices 15 and 16, as well as maintenance device 17, forward. Since the axles connecting these devices to the actuator arms are not at the same distance from rotating axle 12, the pallets pushed by upper displacement device 15 are displaced for a greater distance than the pallets pushed by displacement device 16, which in turn is a greater distance than the distance for which the pallets are pushed by maintenance device 17. The difference between these displacement distances allows two consecutive pallets to be separated or moved together. In FIG. 6b, pallet P3 has been displaced for a certain distance by displacement device 16. Pallet P4 has been displaced for a greater distance than pallet P3 by displacement device 15. Thus, the two pallets are separated by the second separation distance. Conversely, pallet P6, which is located downstream from pallet P5, is displaced by a smaller distance than pallet P5. The pallets are then moved together until they are juxtaposed, corresponding to the first separation distance.

Lateral displacement device 41 on the combs then separates the three combs 26, 30, and 36 from the pallets as shown in FIG. 6c. The combs are respectively laterally displaced on axles 24, 25 and 39. The pallets are then released, and displacing the combs no longer displaces the pallets. When pallets P5 and P6 are released, the bottles they carry are discharged and the pallets are returned to the beginning of the circuit.

Actuator arm 11 is then retracted, moving the three combs to the rear in the position shown in FIG. 6d. During this operation, the pallets do not move.

Devices 41 again advance the combs toward the pallets so that one pallet is held in each notch. This is illustrated in FIG. 6e. The combs are then advanced as before. As the demonstrated by the position of pallets P1 through P4 in FIGS. 6a through 6f, the pallets advance by one notch during each cycle and move along the circuit separated by a first distance on the first portion of the circuit, by a second distance on the second portion of the circuit and, again, by the first distance on the third portion of the circuit.

According to one concrete embodiment, the pallets have a square base with 60 mm sides. Displacement device 15 moves 340 mm, displacement device 16 moves 230 mm, and the maintenance device moves 120 mm. The axes of the notches on displacement device 15 are 170 mm apart, corresponding to the distance between the axes of the impressions on mold used.

The present invention is not limited in its embodiments, but extends to any variation which is obvious to one skilled in the art. It is apparent that the number of notches, as well as their positions, can be modified to meet any geometric operating criteria. The maintenance device ensures correct positioning of the pallets which must be displaced by the displacement devices. The maintenance device could be replaced by a stop, or it could possibly be eliminated in machines that vibrate only slightly.

We claim:

1. A device for moving objects along a circuit comprising at least one rail, said objects being placed on pallets that slide along the rail, and the pallets being separated from one another by at least a first distance on at least one portion of the circuit and by a second distance on at least one second portion of the circuit, said device characterized by comprising an actuator arm (11) pivoting on a rotating axle (12), said actuator arm being connected to at least a first and a second device (15, 16) for displacing said pallets, and said displacement devices being designed to displace said pallets along the rail and separate them by said first distance on the first portion of the circuit and by said second distance on said second portion of the circuit, said displacement devices being connected to said actuator arm (11) at varying distances in relation to its rotating axle (12).

2. A device according to claim 1, characterized in that it comprises elements for displacing the actuator arm (11), which elements are designed to place the arm in what is known as the retracted position, in which the portion of the arm connected to the displacement devices (15, 16) is located near the first portion of the circuit, and in a second position known as the advanced position, in which that portion of the arm is located near the second portion of the circuit.

3. A device according to claim 1, characterized in that each displacement device (15, 16) comprises a comb (26, 30) provided with at least one notch (27) designed to move one pallet.

4. A device according to claim 3, characterized in that the comb (26) of said first displacement device (15) comprises several notches (27) which are regularly spaced, with the distance between the pallets maintained by these notches corresponding to said second spacing.

5. A device according to claim 3, characterized in that the comb (30) of said second displacement device (16) comprises a first notch (32) designed so that when the actuator arm (11) is in the retracted position, the pallets maintained in the first notch of each of the displacement devices are separated from one another by said first distance, with the pallet maintained in said first displacement device (15) being downstream from the pallet maintained by said second displacement device (16), and in that the second displacement device comprises a second notch (33) situated so that when actuator arm (11) is in the advanced position, the pallet maintained in said second notch and the pallet maintained in the last notch of the first displacement device (15) are separated by the first distance, with the pallet maintained in said first displacement device (15) being upstream from the pallet maintained by said second displacement device (16).

6. A device according to claim 5, characterized in that the displacement devices (15, 16) are designed to separate the pallets by said first distance on the third portion of the circuit, located downstream from said second portion of the circuit.

7. A device according to claim 1, characterized in that it comprises a maintenance device (17) formed of at least one comb (36) comprising at least one notch (37), said device being designed to maintain at least one pallet in a position such that it is separated by said first distance from the first pallet maintained by one of the displacement devices when the actuator arm is retracted.

8. A device according to claim 1, characterized in that it comprises elements (41) for laterally displacing the combs, designed to displace the combs laterally in relation to the rail on the circuit.

9. A device according to claim 8, characterized in that the elements (41) for lateral displacement consist of a guide rail (43) with an interior sliding support (42) designed so the combs can be displaced in a direction perpendicular to the rail.

10. A device according to claim 8, characterized in that the displacement devices (15, 16) and the maintenance device (17) are attached to said actuator arm (11) by bearings (29, 35, 40) designed to allow lateral displacement of these devices in relation to the actuator arm.

11. A method for moving objects along a circuit comprising at least one rail, the objects being placed on pallets sliding along the rail, and the pallets being spaced apart by at least one first distance on at least one first portion of the circuit and by a second distance on at least one second portion of the circuit, said method being characterized in that at least one pallet is displaced for a predetermined distance using a first displacement device (15), and at least one other pallet is displaced for a second predetermined distance, which is smaller than the first predetermined distance, using a second displacement device (16), said pallets being separated from each other by said first distance before displacement and by said second distance after displacement, with the two displacement devices (15, 16) being actuated by a single actuator arm (11), which actuator arm may be placed in what is known as the retracted position, in which the portion of the arm connected to the displacement devices (15, 16) is located near the first portion of the circuit, and in a second position known as the advanced position, in which that portion of the arm is located near the second portion of the circuit.

12. A method according to claim 11, characterized in that a series of pallets is displaced using said first displacement device (15), and the pallets in this series are separated from each other by said second distance.

13. A method according to claim 11, characterized in that said second displacement means (16) displaces one pallet located upstream from said series of pallets and being separated from the first pallet in said series by said first distance when the actuator arm is retracted, and another pallet located downstream from said series of pallets and being separated by said second distance from the first pallet in said series of pallets when the actuator arm is retracted.

14. A method according to claim 11, characterized in that the pallets are disengaged from said displacement devices (15, 16) when the actuator arm (11) is in the advanced position, and in that the displacement devices are retracted by placing the arm in the retracted position, and further in that the displacement devices engage around the pallets when the actuator arm has attained the retracted position.

15. A method according to claim 12, characterized in that by using the maintenance device (17), at least one pallet is maintained in such a position that it is separated by said first distance from the first pallet maintained by said displacement devices when the actuator arm is in the retracted position.

* * * * *